SHIELDED INTERCONNECTING WIRING MEDIUM

Filed March 30, 1964 2 Sheets-Sheet 1

INVENTOR.
JIM D. BURCH
HENDRIK B. HENDRIKS
BY
Ronald W. O'Keefe

SHIELDED INTERCONNECTING WIRING MEDIUM

Filed March 30, 1964 2 Sheets-Sheet 2

INVENTOR.
JIM D. BURCH
HENDRIK B. HENDRIKS

BY

Ronald M. O'Keefe

United States Patent Office 3,293,353

Patented Dec. 20, 1966

3,293,353
SHIELDED INTERCONNECTING WIRING MEDIUM

Hendrik B. Hendriks and Jim D. Burch, Phoenix, Ariz., assignors to General Electric Company, a corporation of New York Filed Mar. 30, 1964, Ser. No. 355,634
16 Claims. (Cl. 174—36)

This invention relates to interconnecting media and, in particular, to interconnecting media providing conductive networks for selectively interconnecting electronic components and circuits and to a method for producing the same.

Reliable operation of extremely high speed digital computers having switching times in the order of nanoseconds, for example, requires that signals be transmitted with fidelity and efficiency. The degree to which fidelity and efficiency are attained is a function of the characteristics of the medium interconnecting the signal sources and the signal loads. Noise resulting from signal reflections, magnetic and capacitive cross-coupling, load shifting, ground differences, D.C. level shifts and line impedance changes is directly related to the characteristics of the interconnecting medium and must be minimized for high speed computer operation. The capabilities of conventional interconnecting media, for example, point-to-point wiring, twisted pairs, or planar etched wiring, are severely limited by the susceptibility of each of these media to noise due to one or more of the enumerated causes. The present invention relates to an interconnecting medium which transmits high frequency signals with fidelity and efficiency and which is more suitable than conventional media for extremely high speed computer operation.

Microwave signal transmission lines, for example strip transmission lines and coaxial cable, may be employed to transmit high frequency signals in a computer with fidelity and efficiency. However, such arrangements are expensive and require a large amout of space due to the dimensions of the transmission lines and the large number of connections which must be made. The present invention provides an interconnecting medium for high frequency signals which is compact, convenient and very inexpensive.

Accordingly, it is an object of the present invention to provide an improved interconnecting medium.

It is another object of the invention to provide an interconnecting medium having improved high frequency electrical characteristics and a high signal-to-noise ratio.

It is another object of the invention to provide an inexpensive, compact, interconnecting medium capable of high wiring density and adaptable to automated fabrication.

It is another object of the invention to provide an interconnecting medium which facilitates the formation of complex circuit configurations.

It is a further object of the invention to provide an interconnecting medium having improved reliability.

It is a further object of the invention to provide an improved board for use in an interconnecting medium.

It is a further object of the invention to provide an improved interconnecting medium wherein shielding is provided around each signal conductor.

It is a further object of the invention to provide a method for fabricating such an improved interconnecting medium.

Briefly stated, in accordance with the illustrated embodiment of the invention, a plurality of spaced parallel grooves are formed in an insulative panel and a conductive coating is deposited on the walls of the grooves to provide signal and ground conductors. The grooves are alternately shallow and deep, the deep grooves having a depth equal to at least one-half the thickness of the panel, whereas the shallow grooves have a depth less than one-half the thickness of the panel. Similar grooves and conductors, disposed at an angle with respect to the above-described grooves, are formed in the opposite side of the insulative panel. The deep grooves in one side of the panel intersect the transverse deep grooves in the other side of the panel while the shallow grooves simply pass over the opposite grooves without intersecting them. The intersecting grooves are electrically interconnected by the conductive material therein. The deep grooves thus shield the signal conductors formed in the shallow grooves and provide a ground plane or line between each and every signal conductor. The signal conductors in the shallow grooves are therefore partially surrounded by the ground conductors in the deep grooves and the electrical characteristics of the structure approach those of a coaxial cable.

The signal conductors on one side of the panel may be connected to selected signal conductors on the opposite side by drilling holes between them prior to the deposition of conductive material. Conversely, a selected signal conductor may be terminated by drilling a hole through it after the conductive material has been deposited in the shallow groove. The diameter and depth of the terminating hole is greater than the width and depth respectively of the groove, thereby separating the conductive material on opposite sides of the holes.

The subject matter of the invention is particularly pointed out and distinctly claimed in the concluding portion of the specification. The invention, however, both as to organization and method of operation may best be understood by reference to the following description taken in connection with the accompanying drawing, in which:

Figure 1:
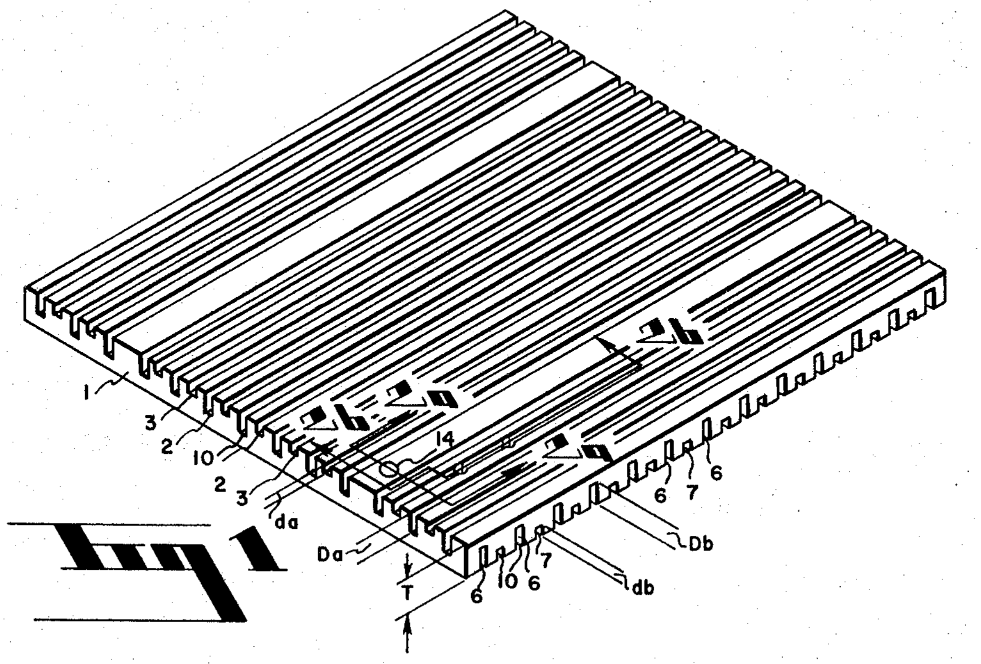
FIG. 1 is a prespective view of an embodiment of an interconnecting medium constructed in accordance with the invention.

With reference to FIG. 1, the embodiment of the invention chosen for illustration employs a sheet or panel 1 of insulative material having a plurality of spaced grooves or sulci 2 and 3 formed in one side of the panel and a plurality of spaced grooves or sulci 6 and 7 also formed in the other side. Panel 1, normally of predetermined and uniform thickness, may be fabricated from any suitable insulative material, for example epoxy paper sheet, and may be curved or planar depending upon application requirements.

Grooves 2 and 3, formed in one side of panel 1, are arranged to be non-intersecting and may be, for example, parallel to each other. The grooves are alternately deep and shallow, reference numeral 2 identifying the deep grooves and reference numeral 3 identifying the shallow grooves. Deep grooves 2 are formed to have a depth $D_a$ which is usually equal to at least one-half the thickness T of the panel. Shallow grooves 3 are formed to have a depth $d_a$ equal to less than one-half the thickness T of the panel. Grooves 2 and 3 may be formed in an insulative panel 1 by various methods, for example, chemical etching, machining, or molding.

A plurality of similarly spaced grooves 6 and 7 are formed in the side of panel 1 opposite that in which grooves 2 and 3 are formed. Grooves 6 and 7 are disposed at an angle with respect to grooves 2 and 3 and may be, for example, perpendicular to grooves 2 and 3. Grooves 6 are similar to grooves 2 and are formed to have a depth $D_b$ which is usually equal to at least one-half the thickness T of panel 1. Alternate shallow grooves 7 are similar to grooves 3 and are formed to have a depth $d_b$ equal to less than one-half the thickness T of panel 1.

Because of the transverse relationship of deep grooves 2 and 6 in opposite sides of panel 1 and the depth to which they have been formed relative to the thickness of panel 1, deep grooves 2 and 6 intersect. This intersection is more clearly illustrated in FIG. 2. Areas 8 indicate the areas of intersection of grooves 2 and 6, these intersections forming apertures in panel 1. If the grooves in opposite sides of the panel are mutually perpendicular, as shown, each deep groove in one side of the panel will intersect each deep groove in the opposite side of the panel.

Referring to FIG. 1, the depths of deep grooves 2 and 6 and of shallow grooves 3 and 7 are controlled so that the sum of $D_a + d_b$ is less than T, and the sum of $D_b + d_a$ is less than T. The deep grooves in one side of panel 1 will therefore not intersect the shallow grooves in the opposite side of the panel. As an alternative to making $D_a$ and $D_b$ both equal to at least one-half the thickness T of panel 1, intersection of grooves 2 and 6 also occurs if one of the grooves has a depth less than one-half the panel thickness and the other groove has a correspondingly greater depth. Thus, grooves 2 and 6 will intersect so long as the sum of $D_a + D_b$ is equal to or greater than T. For example, $D_a$ and $D_b$ may be 0.40T and 0.65T respectively while depth $d_a$ and $d_b$ may be 0.25T.

Conductors are provided in grooves 2, 3, 6 and 7 by depositing on the bottom and side walls of the grooves a conductive coating 10, such as copper. Conventional deposition techniques may be employed. For example, the entire side of the panel including the bottom and side walls of the grooves may be electroplated and the conductive materials then removed from the panel surfaces between grooves by grinding or sanding. As an alternative to plating only the walls of the grooves, the grooves may be entirely filled with a conductive material.

The conductors in shallow grooves 3 and 7 serve as signal conductors in the interconnecting medium of the invention. The conductors in deep grooves 2 and 6 are electrically interconnected due to the continuity of the conductive material 10 between the deep grooves at their areas of intersection. The conductors in deep grooves 2 and 6 are connected to ground or to any other suitable reference potential and provide a shield for the signal conductors in shallow grooves 3 and 7, since the signal conductors in grooves 3 and 7 are completely surrounded on two sides and partially surrounded on the third side by the interconnected shield conductors in deep grooves 2 and 6. The network of shield conductors simulates a ground plane for the signal conductors and the structure therefore approaches the configuration of a co axial transmission line, the signal conductors exhibiting electrical characteristics similar to a coaxial line. The resistance of the matrix network of ground conductors is minimized by the multiple interconection of the ground conductors at the areas of intersection of the deep grooves. The arrangement is particularly effective in minimizing noise due to cross-coupling between the signal conductors and the high frequency signal transmission characteristics of the signal conductors are therefore improved.

Figure 3:
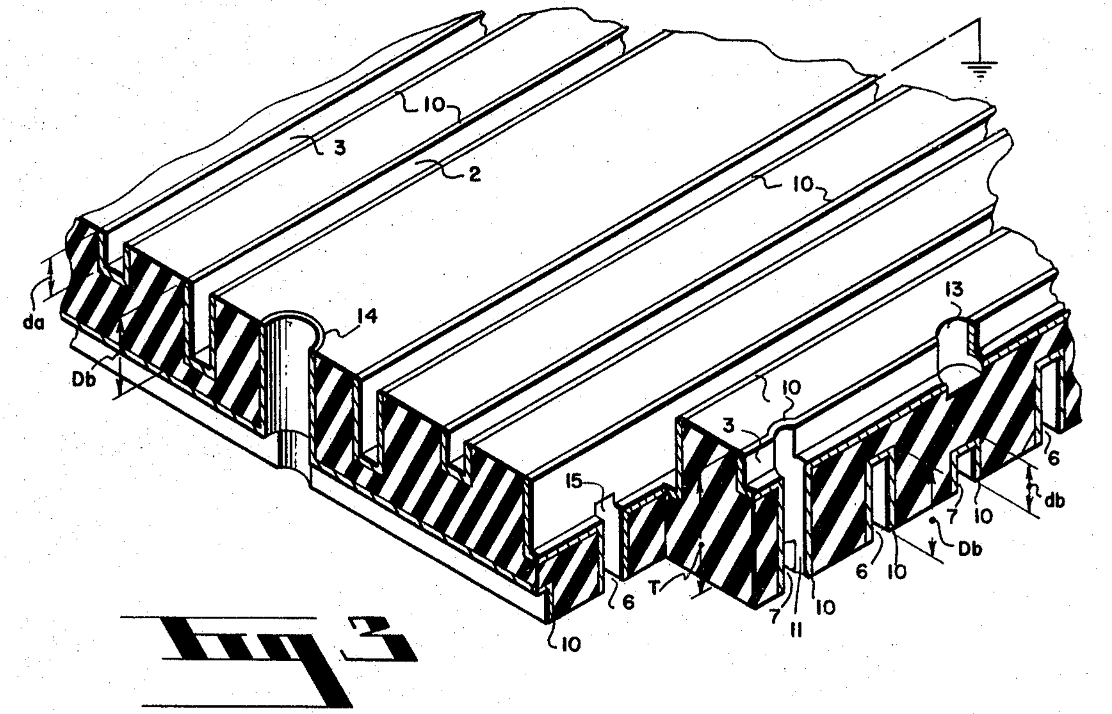
FIG. 3 is an enlarged perspective view of the structure of FIG. 1 taken in section along the lines *2a* and *2b* of FIG. 1.

Selective interconnection of the signal conductors on opposite sides of panel 1 may be effected by forming holes, such as indicated by reference numeral 11 in FIG. 3, which extend between predetermined shallow grooves at their projected points of intersection. The walls of connecting hole 11 are coated with conductive material and the continuity of the conductive material deposited on the walls of the hole and of the shallow grooves serves to electrically interconnect the selected signal conductors on opposite sides of the panel. The conductive coating on the walls of connecting hole 11 is preferably deposited simultaneously with the conductive coating on the walls of the grooves. This provides a continuous electrical conducting path having no ohmic junctures or mechanical type connections such as solder or weld.

Termination of a selected signal conductor may be effected by drilling, piercing, or otherwise forming a hole at a predetermined location in the shallow groove after the conductive coating has been deposited in the manner described above. The diameter and depth of the terminating hole is greater than the width and depth respectively of the shallow groove so as to remove the conductive material from the side and bottom walls of the shallow groove, thereby separating the conductive material on either side of the terminating hole. A terminating hole of this type is illustrated by reference numeral 13 in FIG. 3. Alternatively, termination of a signal conductor may be accomplished during the deposition operation by leaving suitably located gaps in the conductive material deposited on the walls of the shallow grooves.

Provision for application of signals to or derivation of signals from the circuit board interconnecting medium of the invention is made by forming a signal hole 14 in the panel which intersects a selected shallow groove at a predetermined location. The hole is formed prior to the deposition of conductive material so the deposition operation provides a conductive coating on the walls of the signal hole which is electrically connected to the signal conductor in the intersected shallow groove. The signal hole may serve as a female connector for reception of a male connector pin, permitting external connections to be made to the circuit board interconnecting matrix of the invention. A lead of a circuit component may also be inserted in the hole. The end of the hole opposite the intersected shallow groove may be countersunk to facilitate intersection of a connector pin or component lead.

FIG. 3 is an enlarged sectional perspective view of the interconnecting medium of FIG. 1 taken along the lines 2*a* and 2*b* of FIG. 1, and shows in greater detail the structure of the illustrated embodiment of the invention. The continuity of conductive material at the intersection of deep grooves 2 and 6 is illustrated at 15. FIG. 3 also illustrates the detail of a connecting hole 11 which permits signal transmission between selected signal conductors on opposite sides of panel 1. Reference numeral 13 indicates a terminating hole which permits selected portions of a given signal conductor to be separated. A signal hole 14 which enables external connections to be made to a selected signal conductor is also more clearly illustrated in FIG. 3.

In FIGS. 1 and 3 only a single connecting hole, a single terminating hole and a single signal hole have been illustrated in order to simplify description. In practice, a plurality of connecting, terminating and signal holes are formed in the circuit board at predetermined locations to form a desired circuit configuration. Thus, by forming holes in panel 1 at selected locations either before or after deposition of the conductive material, as appropriate to the desired function of the hole, a variety of circuit configurations can be fabricated without soldering, welding or changing the basic structure of the circuit board of the invention.

Figure 2:
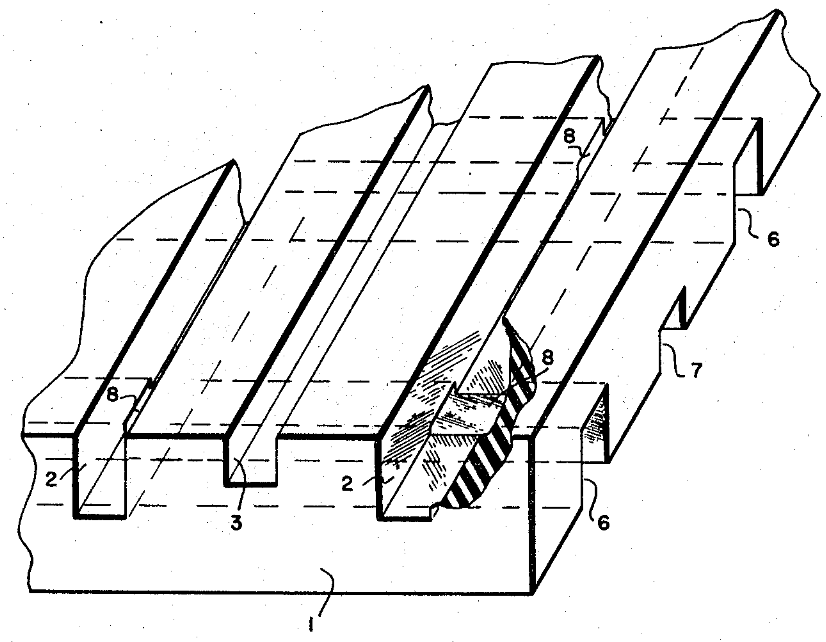
FIG. 2 is an enlarged perspective view of a portion of an embodiment of an interconnecting medium constructed in accordance with the invention showing in greater detail the intersections of deep grooves formed in opposite sides of an insulative panel.
Figure 4:
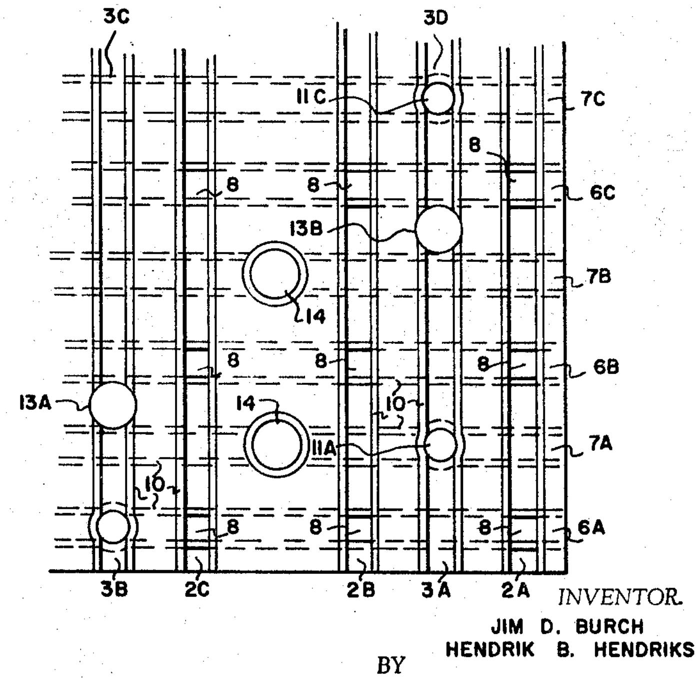
FIG. 4 is an enlarged plan view of a portion of an interconnecting medium constructed in accordance with the invention and illustrating a typical circuit configuration.

FIG. 4 is an enlarged plan view of a portion of a cricuit board interconnecting medium constructed in accordance with the invention and illustrating a simple circuit configuration. The reference numerals employed in conjunction with FIGS. 1, 2 and 3 are applied to FIG. 4 in order to simplify description of the illustrated structure. The deep grooves and shallow grooves formed in the upper side of insulative panel 1 are orthogonal to the deep grooves and shallow grooves, indicated by dashed lines, in the lower side of the panel. Conductive material 10 illustrated in FIG. 4 is deposited on the bottom and side walls of the grooves to provide signal conductors 3A–3D and ground conductors 2A–2C on one side of the panel and signal conductors 7A–7C and ground conductors 6A–6C on the other side of the panel. The ground or shield conductors in the deep grooves in opposite sides of panel 1 are electrically interconnected by the conductive material at the illustrated square intersections 8. Signal conductors 3A and 7A are connected through the round connecting hole 11A. Signal conductor 3B is connected to ground conductor 6A, and therefore to reference potential, through connecting hole 11B. Signal conductor 3B is electrically isolated from signal conductor 3C by means of terminating hole 13A. Signal conductor 3D is interconnected with signal conductor 7C through connecting hole 11C. Signals conductors 7C and 3D are electrically isolated from signal conductors 3A and 7A by means of terminating hole 13B. Signal holes 14 are adapted to receive male connector pins or the leads of circuit components. Signals may therefore be applied to or derived from conductors 7B and 3A or circuit components may be energized by the signals available on these signal conductors.

In describing the illustrated embodiment of the invention, it has been stated that the sum of the depths of the deep grooves in opposite sides of the panel should be equal to or greater than the thickness of the panel. However, the invention is not limited to this structural embodiment and other embodiments of the invention may be fabricated without precisely meeting this criteria. For example, if the sulcated panel is molded from plastic, the molded deep grooves in opposite sides of the panel may be separated by thin films of plastic at the areas where intersections normally occur, due to the nature and tolerances of the molding operation. The sum of the depths of the deep grooves is thus slightly less than, although substantially equal to, the thickness of the panel. The thin plastic films then can be removed by chemical etching prior to the deposition of conductive material to allow electrical interconnection of the conductive material in deep grooves in opposite sides of the panel, thereby forming the desired shield for the signal conductors. Another alternative embodiment may be fabricated by forming all grooves so as to have depths less than one-half the thickness of the panel and then interconnecting alternate grooves in opposite sides of the panel by drilling or piercing apertures through the panel material at the points where the alternate grooves cross prior to the plating operation. The conductive material deposited on the walls of the holes serves to interconnect the ground conductors in the alternate grooves to form the desired shield for the signal conductors in the remaining grooves.

Variation in the electrical characteristics of a sulcated circuit board interconnecting medium constructed in accordance with the invention, for example the characteristic impedance of the signal conductors, may be effected by varying the depth or width of the signal conductor grooves, the spacing between grooves, or the dielectric constant of the insulative material. The following characteristics have been obtained in a circuit board constructed in accordance with the invention employing signal conductors 0.008 inch wide and 0.015 inch deep and ground conductors 0.006 inch wide and 0.035 inch deep in an epoxy paper panel 1/16 inch thick. The signal conductors, alternated with the ground conductors, were spaced at 0.050 inch.

| | | |
|---|---|---|
| Signal line resistance | milliohms per inch | 25 |
| Distributed capacitance | pf. per inch | 1.9 |
| Distributed inductance | nh. per inch | 13 |
| Characteristic impedance | ohms | 65 |
| Velocity of signal propagation | inches per nanosecond | 6.4 |

Sulcated circuit boards have been fabricated, in accordance with the invention, with a density of 80 grooves per inch and even higher wiring densities are practical.

In summary, the interconnecting medium of the invention which serves to interconnect signal sources and signal loads exhibits improved reliability due to elimination of mechanical type connections within the matrix, each conductive path being a continuous piece of copper or other conductive material. The shield or ground plane provided by the interconnected ground conductors results in a high signal-to-noise ratio and improved high frequency electrical characteristics. Complex circuit configurations may be obtained by selectively forming holes at predetermined locations either before or after deposition of the conductive material in the grooves. The interconnecting medium of the invention provides a high wiring density and is readily adapted to automated manufacture with resulting lower cost per point connected. As applied to electronic computers, the circuit board interconnecting medium constructed in accordance with the invention enables reliable high speed computer operation since noise due to reflections, magnetic and capacitive cross-coupling, load shift and line impedance changes is significantly reduced.

Although the invention and its operation has been described with reference to a specific embodiment, the invention is not to be limited to this embodiment. Many modifications will be obvious to those skilled in the art. It is therefore intended that the invention be not limited to the particular details shown and described which may be varied without departing from the spirit and scope of the invention and the appended claims.

What is claimed as new and desired to be secured by Letters Patent of the United States is:

1. An interconnecting medium comprising: a first set of conductors spaced in a first surface, selected conductors of said first set serving as shield conductors and the remaining conductors of said first set serving as signal conductors, a second set of conductors spaced in a second surface which is parallel to said first surface, said conductors of said second set being transverse to said conductors of said first set, selected conductors of said second set serving as shield conductors and the remaining conductors of said second set serving as signal conductors, each of said shield conductors of said first set being electrically connected to each of said shield conductors of said second set to form an electrical shield for the signal conductors of said first and second sets.

2. An interconnecting medium comprising: a first set of conductors spaced in a first surface, alternate conductors of said first set serving as shield conductors and the remaining conductors of said first set serving as signal conductors, a second set of conductors spaced in a second surface which is parallel to said first surface, said conductors of said second set being transverse to said conductors of said first set, alternate conductors of said second set serving as shield conductors and the remaining conductors of said second set serving as signal conductors, each of said shield conductors of said first set being electrically connected to each of said shield conductors of said second set to form an electrical shield for the signal conductors of said first and said second sets.

3. An interconnecting medium comprising: a first set of parallel conductors spaced in a first surface, selected conductors of said first set serving as shield conductors and the remaining conductors of said first set serving as signal conductors, a second set of parallel conductors spaced in a second surface which is parallel to said first surface, said conductors of said second set being transverse to said conductors of said first set, selected conductors of said second set serving as shield conductors and the remaining conductors of said second set serving as signal conductors, each of said shield conductors of said first set being electrically connected to each of said shield conductors of said second set to form an electrical shield for the signal conductors of said first and said second sets.

4. An interconnecting medium comprising: a first plurality of conductors spaced in a first surface, selected conductors of said first plurality comprising a first set and the remaining conductors of said first plurality comprising a second set, a second plurality of conductors spaced in a second surface, said second surface being parallel to said first surface, said conductors of said second plurality being transverse to said conductors of said first plurality, selected conductors of said second plurality comprising a third set and the remaining conductors of said second plurality comprising a fourth set, said conductors of said second and said fourth sets having a predetermined dimension in a direction perpendicular to said first and said second surfaces and the conductors of said first and said third sets having a dimension in a direction perpendicular to said first and said second surfaces which is less than said predetermined dimension, said conductors of said second and fourth sets being electrically connected to provide a shield for the conductors of said first and said third sets.

5. An interconnecting medium comprising: a first plurality of parallel conductors spaced in a first surface, alternate conductors of said first plurality comprising a first set and the remaining conductors of first plurality comprising a second set, a second plurality of parallel conductors spaced in a second surface, said second surface being parallel to said first surface, said conductors of said second plurality being transverse to said conductors of said first plurality, alternate conductors of said second plurality comprising a third set and the remaining conductors of said second plurality comprising a fourth set, said conductors of said second and said fourth sets having a predetermined dimension in a direction perpendicular to said first and said second surfaces and the conductors of said first and said third sets having a dimension in a direction perpendicular to said first and said second surfaces which is less than said predetermined dimension, said conductors of said second and said fourth sets being in electrical contact to provide a shield for the conductors of said first and said third sets.

6. The interconnecting medium of claim 5 which includes: means selectively connecting predetermined conductors of said first set to predetermined conductors of said third set, means selectively terminating predetermined conductors of said first and said third sets at desired locations, and input and output means connected to said conductors of said first and said third sets for selectively applying signals to and deriving signals from said conductors of said first and said third sets.

7. A circuit board interconnecting medium comprising: an insulative panel, a first plurality of spaced parallel grooves formed in one side of said panel, a second plurality of spaced parallel grooves formed in the opposite side of said panel, said grooves of said first plurality being transverse to said grooves of said second plurality, selected grooves of said first plurality intersecting selected grooves of said second plurality, and a conductor in each of said grooves, the conductors in said intersecting grooves being electrically connected through the intersections of said selected grooves of said first and said second pluralities to form a shield for the conductors in the remaining grooves.

8. A circuit board interconnecting medium comprising: an insulative panel of predetermined thickness, a plurality of spaced grooves formed in one side of said panel, said grooves being alternately deep and shallow, a plurality of spaced grooves formed in the other side of said panel, said grooves being alternately deep and shallow, said deep grooves having a depth equal to at least one-half the thickness of said panel and said shallow grooves having a depth equal to less than one-half the thickness of said panel, the grooves in one side of said panel being disposed transverse to the grooves in the other side of said panel with at least some of said deep grooves in opposite sides of said panel intersecting, and a conductor in each of said grooves, the conductors in said shallow grooves serving as signal conductors and the conductors in said deep grooves being electrically interconnected through the intersections of said deep grooves to form a ground plane for said signal conductors.

9. A circuit board interconnecting medium comprising: an insulative panel, a first plurality of spaced grooves formed in one side of said panel, a second plurality of spaced grooves formed in the opposite side of said panel, said grooves of said first plurality being transverse to said grooves of said second plurality, a conductive material deposited on the walls of each of said grooves to form conductors, selected conductors in said first plurality of grooves and selected conductors in said second plurality of grooves being designated as shield conductors and the remaining conductors serving as signal conductors, said signal conductors being insulated from said shield conductors, and means electrically connecting each shield conductor in said first plurality of grooves to each shield conductor in said second plurality of grooves.

10. A circuit board interconnecting medium comprising: an insulative panel of predetermined thickness, a plurality of spaced grooves formed in one side of said panel, said grooves being alternately deep and shallow, a plurality of spaced grooves formed in the other side of said panel, said grooves being alternately deep and shallow, said deep grooves having a depth equal to at least one-half the thickness of said panel and said shallow grooves having a depth equal to less than one-half the thickness of said panel, the grooves in one side of said panel being disposed transverse to the grooves in the other side of said panel with at least some of said deep grooves in opposite sides of said panel intersecting, a conductor in each of said grooves, the conductors in said shallow grooves serving as signal conductors and the conductors in said deep grooves being electrically interconnected through the intersections of said deep grooves to form a shield for said signal conductors, means selectively interconnecting predetermined signal conductors on opposite sides of said panel, means selectively terminating predetermined signal conductors at predetermined locations, and signal input and output means connected to predetermined conductors for applying signals to and deriving signals from said circuit board interconnecting medium.

11. A circuit board interconnecting medium comprising: an insulative planar panel of predetermined thickness, a plurality of spaced substantially parallel grooves formed in one side of said panel, said grooves being alternately deep and shallow with said deep grooves having a depth equal to at least one-half the thickness of said panel and said shallow grooves having a depth equal to less than one-half the thickness of said panel, a plurality of spaced substantially parallel grooves formed in the other side of said panel, said grooves being alternately deep and shallow with said deep grooves having a depth equal to at least one-half the thickness of said panel and said shallow grooves having a depth equal to less than one-half the thickness of said panel, the grooves in one side of said panel being disposed transverse to the grooves in the other side of said panel with at least some of said deep grooves in opposite sides of said panel intersecting, a plurality of holes formed at selected positions in said panel and extending from predetermined shallow grooves in one side of said panel to predetermined shallow grooves in the other side, whereby predetermined pairs of said shallow grooves in opposite sides of said panel are interconnected, and a conductive material deposited on the walls of each of said grooves and said holes to form signal conductors in said shallow grooves electrically interconnected by the conductive material deposited on the walls of said holes and to form ground conductors in said deep grooves electrically interconnected by the conductive material at the intersections to form a ground plane for said signal conductors.

12. The circuit board interconnecting medium of claim 8 in which said shallow grooves have a plurality of terminating holes formed therein at predetermined locations, the diameter and depth of said holes being greater than the width and depth respectively of said shallow grooves, whereby the conductive material in said grooves on either side of said holes is separated to terminate said signal conductors.

13. A board for use in an interconnecting medium comprising: an insulative panel, a first plurality of spaced grooves formed in one side of said panel, and a second plurality of spaced grooves formed in the opposite side of said panel, said first plurality of grooves being transversely arranged to said second plurality of grooves and selected grooves of said first plurality of grooves extending through said panel to a depth to provide openings intersecting selected grooves of said second plurality of grooves.

14. A board for use in an interconnecting medium comprising: an insulative panel, a first plurality of spaced parallel grooves formed in one side of said panel, and a second plurality of spaced parallel grooves formed in the opposite side of said panel, said first plurality of grooves being transversely arranged to said second plurality of grooves and alternately arranged grooves of said first plurality of grooves extending through said panel to a depth intersecting alternately arranged grooves of said second plurality of grooves.

15. A board for use in an interconnecting medium comprising: an insulative panel, a first plurality of spaced grooves formed in one side of said panel, and a second plurality of spaced grooves formed in the opposite side of said panel, selected grooves of said first plurality of grooves and said second plurality of grooves being deep and the remaining grooves being shallow, said grooves of said first plurality of grooves being transverse to said grooves of said second plurality of grooves with at least some of said deep grooves of said first plurality of grooves intersecting some of said deep grooves of said second plurality of grooves.

16. A board for use in an interconnecting medium comprising: an insulative panel of predetermined thickness, a first plurality of spaced grooves formed in one side of said panel, and a second plurality of spaced grooves formed in the opposite side of said panel, said grooves of said first plurality of grooves and said second of grooves being alternately deep and shallow, said deep grooves having a depth equal to at least one-half the thickness of said panel and said shallow grooves having a depth equal to less than one-half the thickness of said panel, said grooves of said first plurality of grooves being transverse to said grooves of said second plurality of grooves with at least some of said deep grooves of said first plurality of grooves intersecting some of said deep grooves of said second plurality of grooves.

References Cited by the Examiner

UNITED STATES PATENTS

| | | | |
|---|---|---|---|
| 1,650,706 | 11/1927 | Gent | 317—112 |
| 2,019,625 | 11/1935 | O'Brien. | |
| 3,076,862 | 2/1963 | Luedicke et al. | 174—68.5 |

LARAMIE E. ASKIN, *Primary Examiner.*

D. L. CLAY, *Assistant Examiner.*